United States Patent [19]

Baltare

[11] 4,445,597
[45] May 1, 1984

[54] SPIDER ASSEMBLY FOR DRUM BRAKE

[75] Inventor: Gunnar Baltare, Portage, Mich.

[73] Assignee: Eaton Corporation, Cleveland, Ohio

[21] Appl. No.: 389,526

[22] Filed: Jun. 17, 1982

[51] Int. Cl.³ ............................................. F16D 65/09
[52] U.S. Cl. ................................. 188/206 A; 188/341
[58] Field of Search ...................... 188/78, 206 A, 328, 188/329, 330, 341

[56] References Cited

U.S. PATENT DOCUMENTS 2,277,577  3/1942  Boldt .......................... 188/206 A X
3,398,814  8/1968  Deibel .
4,157,747  6/1979  Getz et al. ........................... 188/341
4,337,851  7/1982  Pringle ................................ 188/330

Primary Examiner—Duane A. Reger
Attorney, Agent, or Firm—C. H. Grace; H. D. Gordon

[57] ABSTRACT

An improved spider-anchor pin assembly (14) for a drum brake (10) is provided. The improved assembly includes a stamped sheet metal spider body (42) and a one-piece forged anchor pin piece (46) removably attached to the spider body by a plurality of threaded fasteners (82, 84). Preferably, the anchor pin piece is symetrical about a plane (P) extending normal to the axis of the anchor pin sections (94 and 96) and bisecting of the flange section (76) thereof.

6 Claims, 6 Drawing Figures

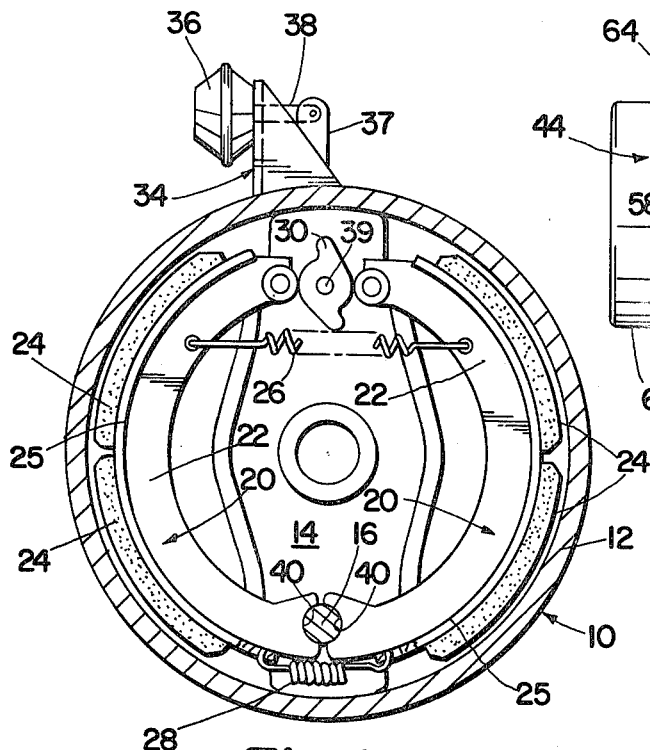
Fig. 1
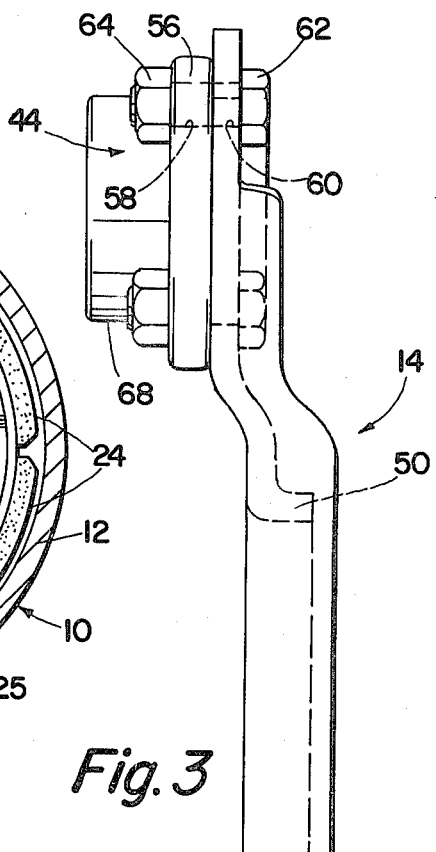
Fig. 3
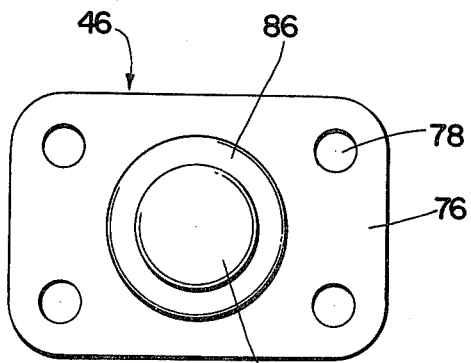
Fig. 4
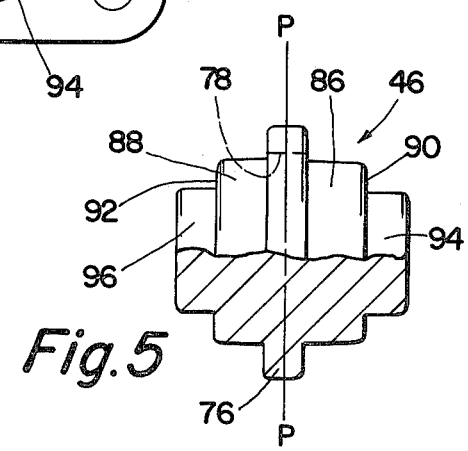
Fig. 5
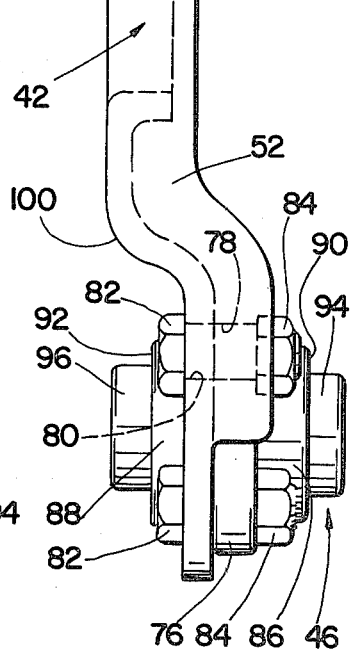

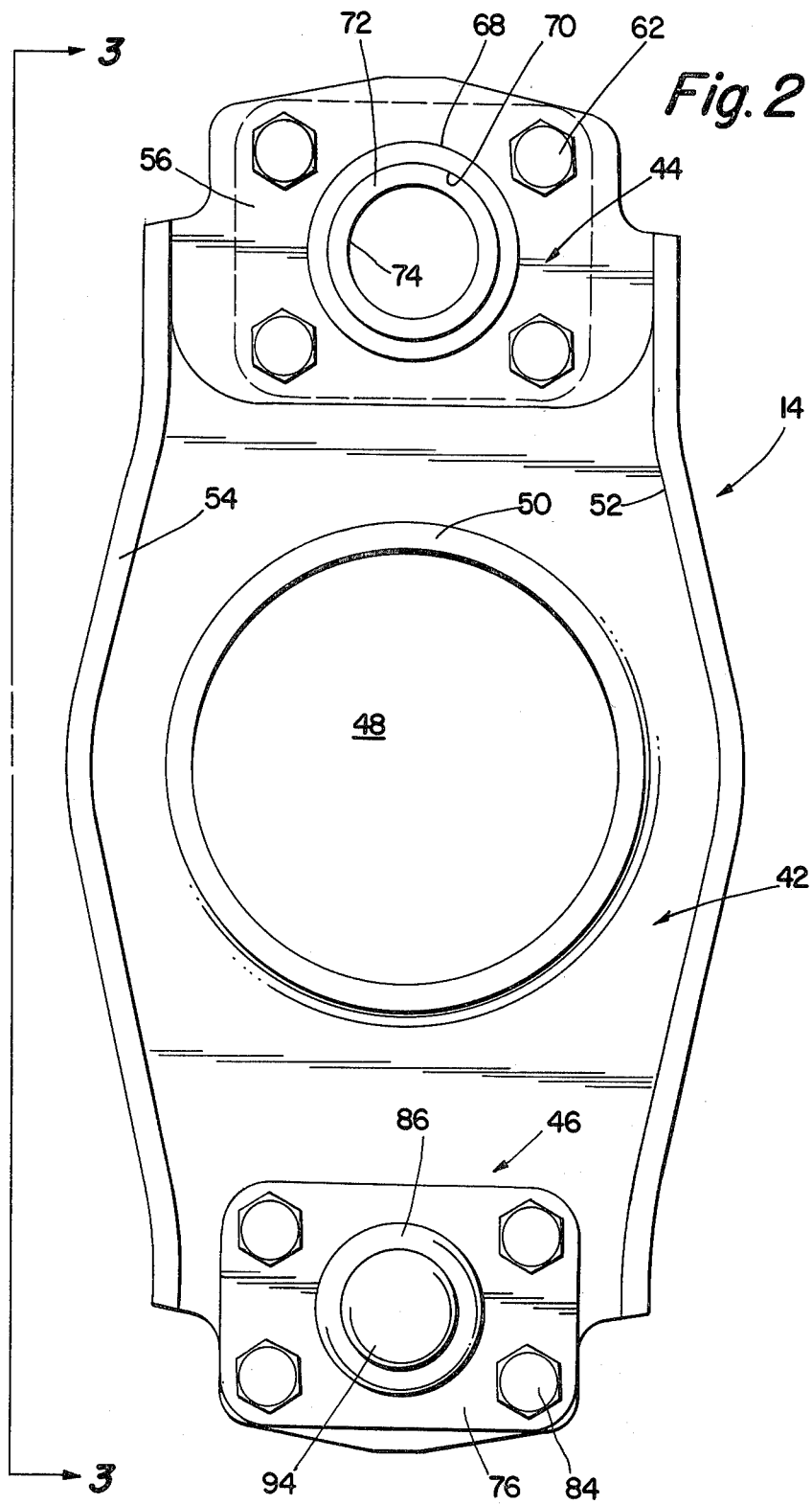

4,445,597

SPIDER ASSEMBLY FOR DRUM BRAKE

BACKGROUND OF THE INVENTION

1. Field of the Invention

The present invention relates to spider assemblies for drum brakes and in particular to an improved spider assembly for a light weight drum brake comprising a stamped spider body and a removable, replaceable anchor pin member mountable thereto.

2. Description of the Prior Art

Drum brakes having a pair of generally arcuate brake shoes pivotally mounted at one end to an anchor structure and selectively actuatable at the other end thereof to pivot radially outwardly relative to the anchor structure to frictionally engage a brake drum are well known in the prior art. Usually, the brake shoes comprise an accurate table carrying the friction material and at least one radially inwardly extending rib or web. Typically, the pivotally mounted ends of the brake shoe webs are formed with either generally concave surfaces or generally annular aperatures which are pivotably supported by an anchor structure comprising a single anchor pin, or a pair of anchor pins, fixed to the brake spider assembly. A resilient retaining member, such as a coil tension spring, may be utilized to retain the brake shoes against the anchor number. Examples of such prior art drum brakes may be seen by reference to U.S. Pat. Nos. 2,710,076; 3,398,814; 3,507,369; 4,157,747 and 3,467,229, all of which are hereby incorporated by reference.

While these prior art devices are generally satisfactory and enjoy great commercial success, a problem has occasionally existed with the anchor pin, or pins, thereof. The anchor pins of the prior art devices, especially brakes having stamped spider bodies, were usually fixedly mounted to the brake support structure, usually referred to as the brake spider, as by a staked press fit. When the anchor pins occasionally became loose, dislodged and/or otherwise damaged, it was difficult to replace same, especially if a press and/or specialized fixtures were not readily available, and often a new spider assembly was required. In certain types of brakes, such as trailer axle brakes, wherein the spider is typically welded or otherwise none removably attached to an axle housing, this situation was particularly unsatisfactory.

SUMMARY OF THE INVENTION

In accordance with the present invention, the drawbacks of the prior art have been reduced or eliminated by the provision of a spider assembly for drum brakes which will permit relatively quick removal and assembly of an anchor member to a drum brake spider body without the requirement of special fixtures and/or a press and/or removal of the spider assembly from the vehicle axle. The present invention also eliminates the requirement of providing an elongated anchor pin receiving bore in the brake spider body. The spider assembly of the present invention comprises a stamped spider body suitable for attachment to a vehicle axle and a removable, replaceable anchor pin member attachable to the spider body by selectively removable attachment means such as bolts and nuts or the like. In the preferred embodiment, the anchor pin member is a one piece forging comprising a flange section provided with bolt apertures therethrough designed to mate with corresponding bolt apertures or studs provided in the spider body for mounting of the anchor pin member to the spider body and anchor pin portions extending axially outwardly from both sides of the flange portion for pivotal receipt of the ends of the brake shoes. The spider body is provided with an aperture for receipt of one of the anchor pin portions allowing the anchor pin member to be reversable thereby minimizing potential assembly errors.

Accordingly, it is an object of the present invention to provide a new and improved spider assembly for a drum brake.

Another object of the present invention is to provide a new and improved spider assembly for a drum brake comprising a stamped spider body and a removably attached one piece anchor pin member.

These and other objects and advantages of the present invention will become apparent from a reading of the detailed description of the invention taken in connection with the drawings.

BRIEF DESCRIPTION OF THE DRAWINGS

FIG. 1 is an illustration of an expanding shoe drum brake utilizing the improved spider assembly of the present invention.

FIG. 2 is a front view of the spider assembly of the present invention.

FIG. 3 is a side view, taken along line 3—3 in FIG. 2, of the spider assembly present invention.

FIG. 4 is a front view of the anchor pin piece of the present invention.

FIG. 5 is a side view, partially in section, of the anchor pin piece of FIG. 4.

DESCRIPTION OF THE PREFERRED EMBODIMENT

Figure 6:
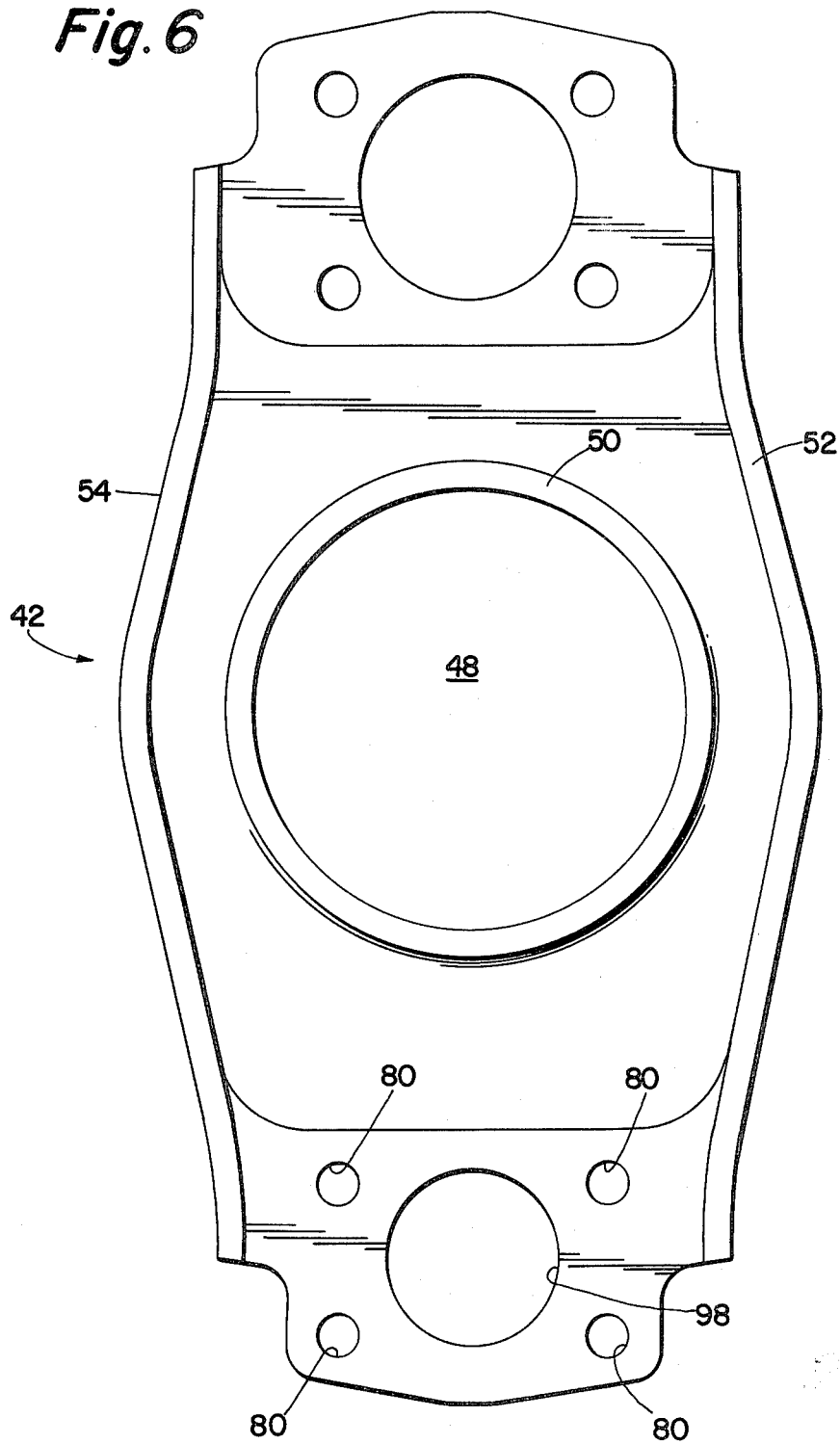
FIG. 6 is a front view of the spider body.

Certain terminology will be used in the following description for convenience in reference only and will not be limiting. The words "upwardly," "downwardly", "rightwardly" and "leftwardly" will designate directions in the drawings to which reference is made. The words "inwardly" and "outwardly" will refer to directions toward and away from, respectively, the geometric center of the designated parts. Said terminology will include the words above specifically mentioned, derivitives thereof, and words of similar import.

Drum brakes, such as vehicle drum brake assembly 10, are well known and an example thereof may be seen by reference to FIG. 1.

Drum brake assembly 10 comprises an annular rotatable brake drum 12, a brake support member or spider 14 nonrotably secured to the vehicle or vehicle axle by welding or by fasteners (not shown) as is well known, a brake shoe pivot or anchor pin 16 secured to the spider 14, a pair of opposed arcuate brake shoes 20 including generally parallel webs 22 and a brake lining 24 of suitable friction material carried by the tables 25, brake shoe return spring 26, brake shoe retaining spring 28 for retaining the shoes 20 on the anchor pin 16, and a cam element 30 for causing radially outward pivotal movement of the brake shoes 20 about anchor pin 16 for retarding the movement of the vehicle.

Brake actuator support or air motor bracket 34 is fixed to the spider 14 and a brake actuator, such as an air motor 36, is affixed to the actuator support. Oscillatory movement of the actuator 36 is converted into rotational movement of the cam 30 by means of a link 38, a lever or slack adjustor body 37 and a cam shaft 39 as is well known in the prior art. Although a rotatable cam 30 is illustrated, other actuation means, such as wedges or the like, may be utilized as is well known in the art.

The opposite axially outer ends of the anchor pins 16 will extend axially beyond the surfaces of the spider 14 for pivotal receipt of the concave cavities, 40, formed in the webs 22. It is understood that, in drum brakes of the type utilizing two anchor pins, the webs may be provided with annular apertures or the like instead of the concave cavities.

The spider assembly 14 of the present invention is illustrated in FIGS. 2 and 3. Spider assembly 14 includes stamped spider body 42, a removable cam shaft support flange 44 and a removable anchor pin piece 46. Spider body 42, which is preferably stamped from suitable steel or the like, is provided with a generally central aperture 48 for receipt of the spindle end of an axle housing or the like as it is well known in the prior art. Although spider body 42 is preferably a stamping, the present invention is equally applicable to those spider assemblies utilizing spider body comprising a casting or the like. An annular rib 50 surrounds aperture 48 and ribs 52 and 54 are formed on the rightward and leftward periphery of the spider body for strengthening and rigidity purposes as well known in the prior art. Spider body 14 may be rigidly attached to a vehicle axle by means of welding or by means of threaded fasteners such as bolts or studs and nuts as is well known in the prior art.

The cam shaft support flange 44 comprises a flanged portion 56 having a pattern of apertures 58 corresponding to apertures 60 provided in the upper portion of the spider body 42 for removably attaching the cam shaft support flange 48 to the spider body 42 by means of bolts 62 and nuts 64. The cam shaft support flange also includes a generally hollow tubular portion 68 defining an axially extending bore 70 in which a bushing 72 is received. The cam shaft 39 is rotationally supported within the inner diameter bore 74 of bushing 72.

Anchor pin piece 46, which may be seen in greater detail by reference to FIGS. 4 and 5, comprises a flanged portion 76 which is provided with a plurality of apertures 78 which will align with apertures 80 provided in the lower end of the spider body 42. The anchor pin piece 46 is removably mounted to the spider body 42 by means of bolts 82 which pass through apertures 78 and 80 and nuts 84 threadably received on bolts 82. Of course, studs may replace the bolts 82. Extending axially outwardly from each side of flange portion 76 are generally cylindrical enlarged diameter portions 86 and 88. The axially outer surfaces 90 and 92, respectively, of enlarged diameter portions 86 and 88, respectively, are separated by a distance generally equal to the separation of the webs 22 of the brake shoes 20. The axially outer ends of enlarged diameter portions 86 and 88, which are of a greater outer diameter than the inner diameter of concave cavities 40, will limit axially inward deflection of the webs 22. Extending axially outwardly from surfaces 90 and 92 are reduced diameter generally cylindrical anchor pin portions 94 and 96. Generally concave cavities 40 on the ends of the brake shoe webs 22 are pivotally supported on anchor pin portions 94 and 96 as is well known in the prior art.

Spider body 42, as may be seen by reference to FIG. 6, is provided with an aperture 98 generally centrally located within the array of apertures 80 allowing passage of enlarged diameter portion 88 of anchor pin portion 46. It is noted that the spider body 42 is bent as at portion 100 thereof to properly locate the anchor pin portions 94 and 96 for pivotal support of the brake shoes 20. As may be seen as reference to FIG. 5, anchor pin portion 46 is substantially identical on both sides a plane P bisecting the flange portion 76 and thus may be assemblied to spider body 32 without concern as to which end is inserted through the aperature 98 provided for receipt of the enlarged diameter generally cylindrical portion 86 or 88.

Preferably, anchor pin portion 46 is a solid one-piece forging which will provide the proper rigidity and wear characteristics for an anchor pin member. Of course, for twin anchor pin drum brakes two enlarged diameter portions and anchor pin portions could extend from each side of the flange portion 76.

By utilizing the spider assembly 14 of the present invention comprising a preferably light weight stamped spider body and an a relatively tough, wear resistant anchor pin flange portion 46 which is easily assemblable to and removable from the spider body 42, an improved spider assembly 14 is provided which is relatively light in weight, which provides an anchor pin portion which is relatively tough and wear resistant and which provides an anchor pin portion which is easily removed from the spider body without requiring removal of the spider body from the axle housing.

To replace a worn or a damaged anchor pin portion 46, nuts 84 are simply removed from bolts 82 and the worn or damaged anchor pin portion 46 is removed and replaced by a new anchor pin portion 46 which is reattached by means of the bolts 82 and nuts 84. Such a replacement may be accomplished without requiring removal of the spider body from the axle housing and utilizing commonly available hand tools or the like.

Although the preferred embodiment of the present invention has been described with a certain degree of particularity, it is understood that the present description is by way of example only and that certain rearrangement and/or substitution of the parts is possible without departing from the spirit and the scope of the invention as herein after claimed.

I claim:

1. An improved spider-anchor pin assembly for a drum brake of the type having a spider mountable to an axle housing, a pair of generally arcuate brake shoes each having a pair of radially inwardly extending generally parallel webs straddling said spider and pivotably supported on anchor pin means fixed to the spider, and means to selectively pivot said brake shoes radially outwardly on said anchor pin means into frictional contact with a brake drum, said improved spider-anchor pin assembly comprising:

a stamped metallic spider body mountable to an axle housing, said spider body provided with a first through bore located generally at the pivot axis of said brake shoes, said spider body defining a generally flat surface extending generally normally to the axis of said first through bore and surrounding said first through aperture, a plurality of second bores opening on said flat surface and defining a given bolt hole pattern, an anchor pin piece formed from a one-piece metallic forging, said anchor pin piece comprising a generally flat flange section defining a generally flat flange surface on at least one side thereof, said flange section provided with a plurality of third bores defining said given bolt hole pattern, and an anchor pin section extending axally outwardly from each side of said flange section, said flange surface abutting said generally flat surface with said second and that third bores in alignment and one of said anchor pin sections extending through and beyond said first through bore; and an externally threaded fastener extending through each of said aligned second and third bores and threadably receiving a nut on the free ends thereof to removably attach said anchor pin piece to said spider body.

2. The improved spider-anchor pin assembly of claim 1 wherein said anchor pin piece comprises an enlarged outer circumference section axially interposed each of said anchor pin sections and said sides of said flange sections, the axially outward surfaces of said enlarged outer circumference sections separated by an axial distance generally equal to the separation of said webs at the pivot axes thereof.

3. The improved spider-anchor pin assembly of claim 2 wherein said enlarged outer circumference sections are generally cylindrically shaped and have an outer diameter smaller than the inner dimensions of said first through aperture.

4. The improved spider-anchor pin assembly of claim 3 wherein said anchor pin sections are generally cylindrically shaped and the outer diameter of said anchor pin sections are smaller than the outer diameter of said enlarged outer circumference sections.

5. The improved spider-anchor pin assembly of claims 3 or 4 wherein said anchor pin pieces are substantially symetrical about a plane normal to the axis of said anchor pin sections and bisecting said flange section.

6. The improved spider anchor pin assembly of claims 5 wherein said second and third bores are through bores and said externally threaded fasteners are headed bolts extending through each of said second and third through bores.

* * * * *